United States Patent
Ito et al.

(10) Patent No.: US 7,031,834 B2
(45) Date of Patent: Apr. 18, 2006

(54) NAVIGATION SYSTEM

(75) Inventors: Toshiyuki Ito, Toyohashi (JP);
Katsuhiko Mutoh, Obu (JP); Hedeki Tanino, Kariya (JP); Kohji Katoh, Obu (JP)

(73) Assignee: Denso Corporation, Kariya (JP)

( * ) Notice: Subject to any disclaimer, the term of this patent is extended or adjusted under 35 U.S.C. 154(b) by 131 days.

(21) Appl. No.: 10/729,957

(22) Filed: Dec. 9, 2003

(65) Prior Publication Data

US 2004/0122588 A1 Jun. 24, 2004

(30) Foreign Application Priority Data

Dec. 24, 2002 (JP) .............................. 2002-372091

(51) Int. Cl.
*G01C 21/34* (2006.01)

(52) U.S. Cl. ..................... 701/212; 701/214; 701/207; 340/995.14

(58) Field of Classification Search ........... 340/995.17, 340/995.25, 995.11, 995.14; 701/212
See application file for complete search history.

(56) References Cited

U.S. PATENT DOCUMENTS 6,307,485 B1 * 10/2001 Hasegawa .............. 340/995.15
6,349,259 B1 * 2/2002 Sato .......................... 701/207
6,654,683 B1 * 11/2003 Jin et al. .................... 701/207

* cited by examiner

*Primary Examiner*—Thomas G. Black
*Assistant Examiner*—Christine M. Behncke
(74) *Attorney, Agent, or Firm*—Posz Law Group, PLC

(57) ABSTRACT

A vehicle navigation system has a plurality of maps, measurement modes, and operation modes. When the measurement mode is a standard in an accuracy priority mode, low detail rate map is used to display a current position. When the measurement mode is a precise measurement in the accuracy priority mode, a city map is used to display the current position. When the low detail rate map is used in a map priority mode, the measurement mode is set to the standard. When the city map is used in the map priority mode, the measurement mode is set to the precise measurement.

10 Claims, 3 Drawing Sheets

FIG. 3

| MAP SCALE | MEASUREMENT MODE |
|---|---|
| 1 | STANDARD |
| 2 | STANDARD |
| 3 | STANDARD |
| 4 | PRECISE |

FIG. 5

| | AVAILABLE MEASUREMENT | MAP SCALE | MEASUREMENT MODE |
|---|---|---|---|
| ACCURACY PRIORITY MODE | PRECISE | 4 | PRECISE |
| | STANDARD | 3, 2, 1 | STANDARD |
| MAP PRIORITY MODE | PRECISE | 4 | PRECISE |
| | | 3, 2, 1 | STANDARD |
| | STANDARD | 3, 2, 1 | STANDARD |

NAVIGATION SYSTEM

CROSS REFERENCE TO RELATED APPLICATIONS

This application is based on Japanese Patent Application No. 2002-372091 filed on Dec. 24, 2002, the contents of which are incorporated herein by reference.

BACKGROUND OF THE INVENTION

1. Field of the Invention

The present invention relates to a navigation system that shows a current position on a map.

2. Description of Related Art

A navigation system has a plurality of maps, which have different detail rates. The navigation system displays one of the maps by a selection operation of a user to show a current position on the map. The detail rate of the map includes a scale of the map, a displaying density, and so on. The current position is determined by means of a global positioning system (GPS), a map matching, or the like. The GPS uses one of a plurality of measurement methods. In one of the measurement methods, a measurement accuracy of the GPS is relatively low but can be maintained with stability. In another measurement method, the GPS can measure with accurate but with unstable. The measurement accuracy is an accuracy of the determining of the current position.

For example, an autonomous positioning GPS and a differential GPS (D-GPS) belong to the former one. The autonomous positioning GPS has the accuracy of the measurement within the order of ten meters. The autonomous positioning GPS can maintain the measurement accuracy whenever the GPS receives location data from GPS satellites. The D-GPS is a method that determines the current position based on the location data and a correction data. The location data is received from the GPS satellites. The correction data is received from a reference station, which is fixed at a reference position. The D-GPS has the accuracy of the measurement within a few meters. When the D-GPS once receives the correction data from the reference station, the D-GPS can maintain the measurement accuracy for a certain time whenever the D-GPS receives the location data from the GPS satellites even if the D-GPS does not receive the correction data.

A kinematics positioning is an example of the later one, which can measure with accurate but with unstable. The kinematics positioning uses a portion of a carrier wave of the location data, which is transmitted from the GPS satellites, as well as the location data from the GPS satellites. In the kinematics positioning, the measurement of the current position is carried out based on determinations of a path difference and a baseline vector. The path difference is a difference between a first path distance and a second path distance. The first path distance is a distance between the GPS satellites and the reference position. The second path distance is a distance between the GPS satellites and the current position. The baseline vector is a vector of the current position with respect to the reference position when viewed from the locations of the GPS satellites. The measurement accuracy of the kinematics positioning is within a few centimeters, which is accurate than the former one.

In the kinematics positioning, the determination of the baseline vector requires to use a lot of correction data with respect to the reference position. In order to achieve the measurement of the current position in real time in the kinematics positioning, the reference station have to continue to transmit the correction data to a kinematics positioning GPS receiver, which is located at the current position. If the continuous data transmission of a lot of the correction data is not achieved, the kinematics positioning cannot achieve the expected measurement accuracy. Accordingly, in the kinematics positioning, the current position is measured with accurate but with unstable.

By the way, the navigation system has no relation between the measurement method and the detail rate of the map. Accordingly, there is a problem in the navigation system. For example, suppose that a vehicle drives in an urban area and the navigation system mounted on the vehicle shows the current position measured by means of the autonomous positioning GPS receiver on a detail map, such as a city map. In such a situation, since the actual measurement accuracy of the autonomous positioning GPS receiver is the order of ten meters, the current position may be plotted on a distant position in the city map away from an actual current position, such as in a distant road or in a building. This gives an unsuitable feeling to the user.

On the other hand, suppose that the kinematics positioning GPS receiver is used for measuring the current position when the navigation system uses a relatively low detail rate map, such as a wide view of a city, to plot the current position. In such a situation, there is no problem whenever the kinematics positioning GPS receiver measures with accurate. However, the kinematics positioning GPS receiver is unstable as described above, so that the measurement accuracy of the kinematics positioning may be worse than the detail rate of the map, for example in comparison with using the autonomous positioning GPS receiver.

Accordingly, in the vehicle navigation system, when the current position is displayed in the map, the displaying of the map may give the user unsuitable feeling according to a relation between the detail rate of the map and the measurement accuracy.

SUMMARY OF THE INVENTION

In view of the foregoing situation, it is an object of the present invention to provide a navigation system that controls a relation between a detail rate of a map and measurement accuracy as appropriate to decrease unsuitable feeling of a user when a current position is displayed on a map.

According to one aspect of the present invention, the navigation system has position determination units, maps, a display, and a controller. The position determination units have a first position determination unit and a second position determination unit. The first position determination unit determines a position as a first position. The second position determination unit determines the position as a second position accurately than the first position determination unit. The maps have a first map and a second map. The second map is more detail than the first map. The display displays one of the first position and the second position on one of the first map and the second map. The controller controls a relation between the position determination units and the maps to display one of the first position and the second position on one of the maps in the display.

Therefore, when the navigation system has a plurality of position determination units and a plurality of maps, the controller can control the relation as appropriate and the position determined by one of the position determination units is displayed on one of a suitable map.

BRIEF DESCRIPTION OF THE DRAWINGS

The above and other objects, features and advantages of the present invention will become more apparent from the following detailed description made with reference to the accompanying drawings. In the drawings:

FIG. 3 shows a relation between a scale of a map and a measurement mode according to the embodiment;

FIG. 5 is a classification table showing the operation of the navigation system according to the embodiment.

DETAILED DESCRIPTION OF PREFERRED EMBODIMENTS

The preferred embodiments of the present invention will be explained with reference to the accompanying drawings.

Figure 1:
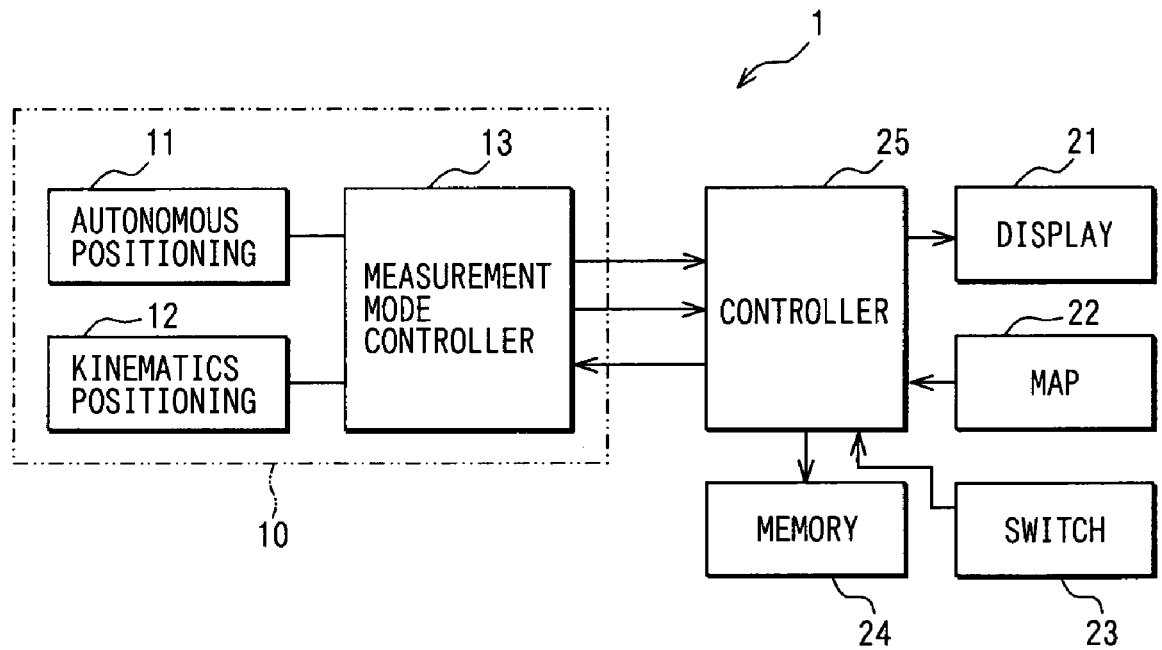
FIG. 1 is a schematic block diagram showing a navigation system according to an embodiment of the present invention.

As shown in FIG. 1, a vehicle navigation system 1 has a positioning device 10, a display 21, a map data input device 22, operational switches 23, a memory 24, and a controller 25.

The memory 24 has a random access memory (RAM), a read only memory (ROM), a flash memory, and so on.

The controller 25 has a CPU, and controls almost all operations of the vehicle navigation system 1. The controller 25 reads a program that is stored in the ROM of the memory 24, and carries out the program. The controller 25 controls a writhing and a reading of data from and to the RAM and the flash memory if necessary. The controller 25 exchanges data with the positioning device 10, the display 21, and the operational switches 23. The controller 25 outputs a read command to the map data input device 22. The map data input device 22 outputs the map data to the controller 25 in response to the read command. The controller 25 reads map data by receiving the map data from the map data input device 22.

The display 21 has a liquid crystal display (LCD) that displays a map, a text, an image, and so on.

The map data input device 22 has a reading device that reads a recording medium, such as a DVD-ROM and a hard disk drive (HDD). The map data input device 22 outputs the map data, which is stored in the DVD-ROM and the HDD, to the controller 25 in response to the read command. In the embodiment, the map data has four different scales, which are a 320,000:1 scale (wide-area map, first scale), an 80,000:1 scale (second scale), a 5,000:1 scale (third scale), and a 2,500:1 scale (city map, fourth scale). With respect to detail rate of the map data, the fourth scale is the most detail and the first scale is the least.

The operational switches 23 have a touch panel, push buttons, or the like. The touch panel is disposed on topside of a screen of the display 21. The push buttons are disposed on a periphery of the display 21. The operational switches 23 output an input signal to the controller 25. The input signal is provided based on an input of a user.

The positioning device 10 has an autonomous positioning GPS receiver 11, a kinematics positioning GPS receiver 12, and a measurement mode controller 13.

The autonomous positioning GPS receiver 11 determines a current position of a vehicle in which the vehicle navigation system 1 is mounted through the use of an autonomous positioning method. The autonomous positioning GPS receiver 11 has a GPS antenna. It receives location data from a plurality of GPS satellites by means of the GPS antenna, and determines the current position of the vehicle based on the location data. The measurement accuracy of the autonomous positioning GPS receiver 11 is the order of tens of meters. The autonomous positioning GPS receiver 11 outputs data of the current position to the measurement mode controller 13 along with an accuracy data of the measurement. If the current position is displayed on the city map of the fourth scale, according to the measurement accuracy of the autonomous positioning method, the displaying of the map with the current position may give the user unsuitable feeling due to a large error.

The kinematics positioning GPS receiver 12 determines the current position of the vehicle in which the vehicle navigation system 1 is mounted through the use of a kinematics positioning method. The kinematics positioning method uses a location data, a correction data, and a carrier phase data. The location data is received from the GPS satellites. The correction data is received from a reference station, which is fixed at a reference position. The carrier phase data is a carrier phase of a carrier wave transmitted from the GPS satellites.

In the kinematics positioning method, the current position is determined based on a path difference and a baseline vector. The path difference is a difference between a first path distance and a second path distance. The first path distance is a distance between the GPS satellites and the reference position. The second path distance is a distance between the GPS satellites and the current position. The baseline vector is a vector of the current position with respect to the reference position when viewed from the locations of the GPS satellites. The measurement accuracy of the kinematics positioning method is within a few centimeters. Accordingly, when the current position is displayed on the city map of the fourth scale, the displaying of the map with the current position does not give the user unsuitable feeling.

The kinematics positioning GPS receiver 12 has a GPS antenna and a radio communication device to realize the measurement of the kinematics positioning method. The kinematics positioning GPS receiver 12 receives location data from the GPS satellites by means of the GPS antenna. The kinematics positioning GPS receiver 12 also receives the correction data from the reference station by means of the radio communication device. The kinematics positioning GPS receiver 12 determines the current position based on the received data, which include the location data and the correction data. The kinematics positioning GPS receiver 12 provides the determined data of the current position to the measurement mode controller 13 along with an accuracy data of the measurement.

In the kinematics positioning method, the navigation system 1 have to receive a lot of data from the reference station and have to always receive the location data from the same GPS satellites to maintain the high accuracy of the measurement. When such a condition is not satisfied, the accuracy of the measurement becomes worse or the measurement itself becomes impossible. Accordingly, the kinematics positioning method is accurate but unstable.

The measurement mode controller 13 receives the current position data and the accuracy data from the autonomous positioning GPS receiver 11 and the kinematics positioning GPS receiver 12. The measurement mode controller 13 determines whether the GPS receivers 11, 12 operate or not based on the received data and predetermined criteria. It also determines whether the GPS receivers 11, 12 have the predetermined accuracies based on the received data and the predetermined criteria. After that, the measurement mode controller 13 outputs the result of the determinations as measurement data to the controller 25.

In detail, when the measurement mode controller 13 determines whether the kinematics positioning GPS receiver 12 achieves the expected measurement accuracy, a certain condition whether the measurement accuracy outputted from the kinematics positioning GPS receiver 12 is less than or equal to ten centimeters is used as the predetermined criteria. When the measurement mode controller 13 determines whether the GPS receivers 11, 12 operate or not, another condition whether the current position data is outputted from each GPS receiver 11, 12 is used as the predetermined criteria.

The measurement mode controller 13 receives an instruction command from the controller 25 about which one of the current position data received from the autonomous positioning GPS receiver 11 and the kinematics positioning GPS receiver 12 should be outputted. That is, the measurement mode controller 13 receives the instruction command of a measurement mode. Then, the measurement mode controller 13 outputs one of the current position data of the GPS receivers 11, 12, which is instructed by the controller 25, to the controller 25 along with the accuracy data of the measurement. The measurement mode controller 13 has a field programmable gate array (FPGA), in which a hardware construction is programmed to carry out the operation.

Next, an operation of the vehicle navigation system 1 will be explained. The vehicle navigation system 1 has two measurement modes, which are a standard measurement mode and a precise measurement mode. In the standard measurement mode, the current position data measured by the autonomous positioning GPS receiver 11 is outputted to the controller 25. In the precise measurement mode, the current position data measured by the kinematics positioning GPS receiver 12 is outputted to the controller 25.

The vehicle navigation system 1 also has two operation modes, which are an accuracy priority mode and a map priority mode. The vehicle navigation system 1 operates in one of the accuracy priority mode and the map priority mode. In the accuracy priority mode, a scale of the map that shows the current position is determined based on which mode is used. In the map priority mode, one of the measurement modes that include the standard measurement mode and the precise measurement mode is generally selected based on which map is used for showing the current position.

Switching of the vehicle navigation system 1 between the accuracy priority mode and the map priority mode is carried out with an operation of the operational switches 23 by the user. When a switching signal is inputted into the controller 25 from the operational switches 23 by the operation of the operational switches 23, the controller 25 switches the operation mode to the designated operation mode. The controller 25 stores operation mode data of its present operation mode in the memory 24 after switching of the operation mode.

Figure 2:
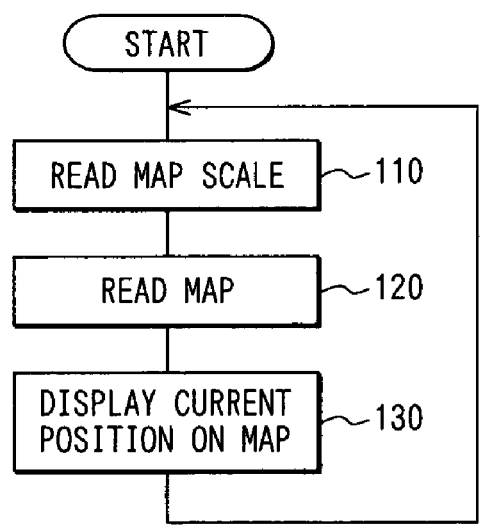
FIG. 2 is a flowchart showing an operation of a controller of the navigation system according to the embodiment.

FIG. 2 shows the operation of the controller 25 for displaying the current position, which is determined by the autonomous positioning GPS receiver 11 or the kinematics positioning GPS receiver 12. The operation of the controller 25 shown in FIG. 2 is started when a power of the vehicle navigation system 1 is turned on. The operation of the controller 25 is carried out in parallel with another process of the vehicle navigation system 1.

In step 110, the controller 25 reads a set value of the map scale stored in the memory 24. The set value of the map scale indicates which map among the first to fourth scale is used for displaying the current position. The set value of the map scale is changed by an operation of the controller 25 as discussed later.

In next step 120, the controller 25 reads a certain area of the map data, which corresponds to the set value of the display scale, from the map data input device 22. The certain area includes a position that is indicated by the current position data, which is inputted from the measurement mode controller 13.

In next step 130, the controller 25 outputs image data to the display 21. In the image data, the current position is plotted on the map in accordance with the map data. Accordingly, the current position is displayed on the map in the display 21. After that, the process returns to step 110.

The vehicle navigation system 1 shows the current position on the map by means of the display 21 based on the operation of the controller 25. However, when the controller 25 detects an input signal from the operational switches 23 to display another image that is required to another process other than the displaying of the map for the vehicle navigation system 1, the controller 25 stops the operation shown in FIG. 2. The controller 25 starts again the operation shown in FIG. 2 when the controller 25 detects another input signal from the operational switches 23 to display again the image for the map.

FIG. 3 shows a relation between the scale of the map and the measurement mode with respect to the operation of the vehicle navigation system 1. When the measurement mode is set to the standard measurement mode in a condition that the navigation system 1 operates in the accuracy priority mode, the map that is displayed on the display 21 is selected from among three scales, which include the first scale, the second scale, and the third scale. When the measurement mode is set to the precise measurement mode in the condition that the navigation system 1 operates in the accuracy priority mode, the map that is displayed on the display 21 is set to the fourth scale. When one of the maps of the first to third scales is used for displaying the current position in a condition that the navigation system 1 operates in the map priority mode, the measurement mode is set to the standard measurement mode. When the map of the fourth scale is used for displaying the current position in the condition that the navigation system 1 operates in the map priority mode, the measurement mode is set to the precise measurement mode.

Figure 4:
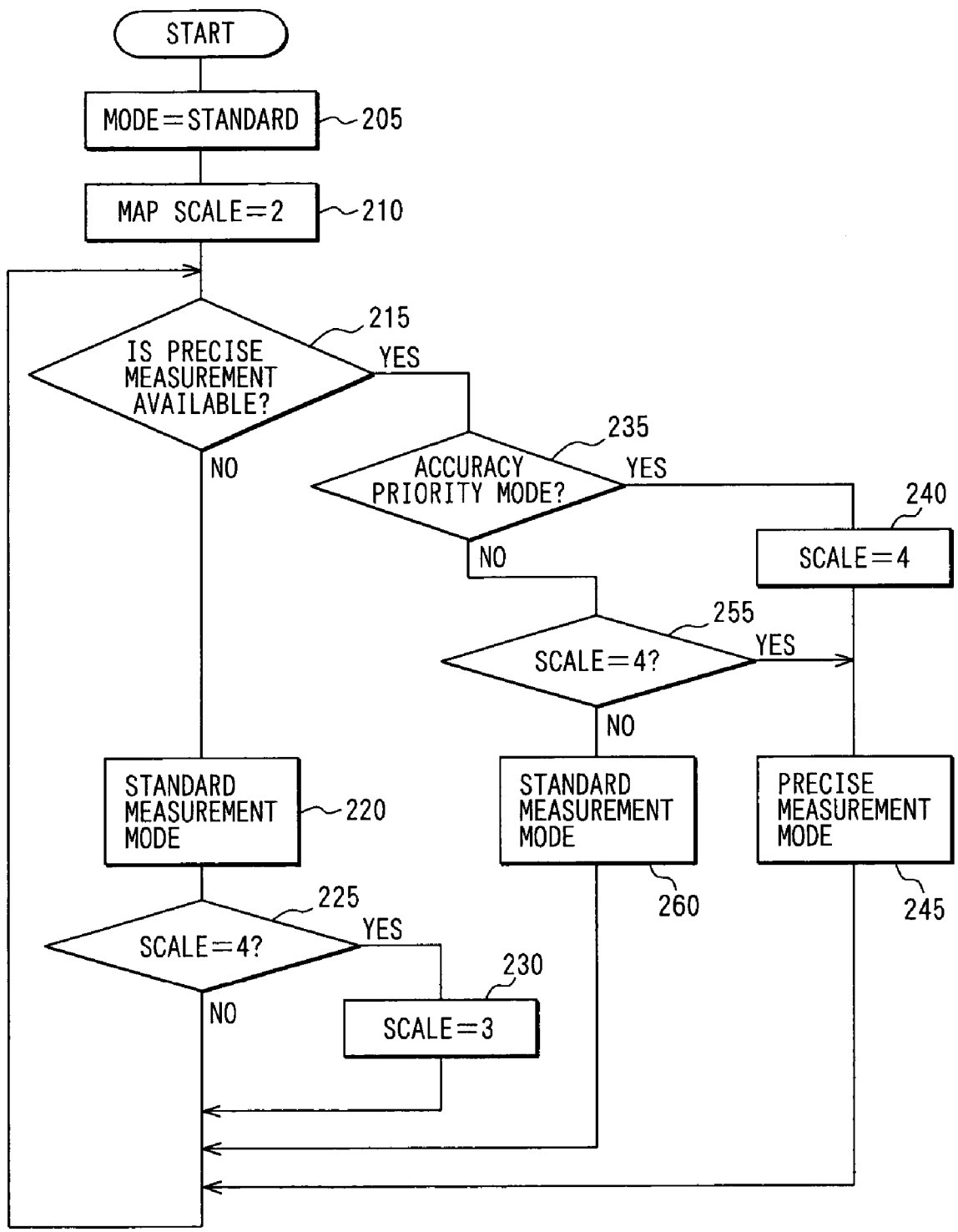
FIG. 4 is a flowchart showing an operation of the controller of the navigation system according to the embodiment.

FIG. 4 shows a flowchart (program) that is carried out by the controller 25 to determine the measurement mode and the scale of the map based on the operation mode and a condition whether a precise measurement is available or not. The precise measurement is a measurement by the kinematics positioning GPS receiver 12. The operation of the controller 25 shown in FIG. 4 is started when the vehicle navigation system 1 is turned on. The operation shown in FIG. 4 is carried out in parallel with another process of the vehicle navigation system 1.

In step 205, the measurement mode is set to the standard measurement mode as an initial setting. In detail, the controller 25 outputs an instruction signal to the measurement mode controller 13 so that the measurement mode controller 13 outputs the current position data measured by the autonomous positioning GPS receiver 11.

In next step 206, the scale of the map displayed on the display 21 is set to the second scale as the initial setting. In detail, the set value of the map scale is set to a value that indicates the second scale, and the value is written in the memory 24. In settings of the map scale in following steps, each scale is written in the memory 24 in the same manner as step 206.

In step 215, the controller 25 determines a condition whether the precise measurement is available or not. The condition, in which the precise measurement is available, is a condition that the kinematics positioning GPS receiver 12 can measure within the expected measurement accuracy. In detail, the controller 25 determines whether the controller 25 receives a certain signal from the measurement mode controller 13. The certain signal indicates that the kinematics positioning GPS receiver 12 measures in the expected measurement accuracy. When the precise measurement is not available, the process proceeds to step 220.

In step 220, the measurement mode is set to the standard measurement mode in the same manner as step 205. In next step 225, the controller 25 determines whether the map currently displayed on the display 21 is set to the fourth scale or not. The current scale is determined by reading the set value stored in the memory 24. If the map currently displayed on the display 21 is not set to the fourth scale, the process returns to step 215. If the map currently displayed on the display 21 is set to the fourth scale, the map is set to the third scale in step 230. Then, the process returns to step 215.

When the controller 25 determines that the precise measurement is available in step 215, the process proceeds to step 235. In step 235, the controller 25 determines whether the operation mode is set to the accuracy priority mode or not by reading the operation mode data stored in the memory 24.

When the operation mode is set to the accuracy priority mode, the map is set to the fourth scale in step 240. Then, the measurement mode is set to the precise measurement mode in step 245. In detail, the controller 25 outputs the instruction signal for setting the precise measurement mode to the measurement mode controller 13 so that the measurement mode controller 13 outputs the current position data determined by the kinematics positioning GPS receiver 12. After that, the process returns to step 215.

When the controller 25 determines that the operation mode is not set to the accuracy priority mode in step 235, the process proceeds to step 255. In other words, when the operation mode is set to the map priority mode, the process proceeds to step 255. In step 255, the controller 25 determines whether the map currently displayed on the display 21 is set to the fourth scale or not.

When the map currently displayed on the display 21 is set to the fourth scale, the process proceeds to step 245. In step 245, the measurement mode is set to the precise measurement mode. When the measurement mode is already set to the precise measurement mode, the controller 25 maintains the measurement mode in step 245. Then, the process returns to step 215.

When the map currently displayed on the display 21 is not set to the fourth scale, the process proceeds to step 260. In step 260, the measurement mode is set to the standard measurement mode. When the measurement mode is already set to the standard measurement mode, the controller 25 maintains the measurement mode in step 260. Then, the process returns to step 215.

The user can operate the operational switches 23 to change the scale of the map during the process. When the controller 25 receives the operational signal to change the map scale from the operational switches 23, the controller 25 rewrites the set value of the map scale to the designated scale in the memory 24 as a parallel processing in parallel with the process shown in FIG. 4. However, a repetition process per a cycle shown in FIG. 4 is repeated in a very short time. As a result, when the steps 225, 230, and 240 are periodically carried out in the repetition process, the change of the map scale by the user is equal to being prohibited in effect.

FIG. 5 shows a table that summarizes operational statuses according to the processes of the controller 25 in the vehicle navigation system 1.

As shown in FIG. 5, when the precise measurement is available in the accuracy priority mode, the measurement mode is fixed to the precise measurement mode and the map for displaying the current position is limited to the fourth scale by means of the processes of steps 240, 245 shown in FIG. 4. Accordingly, when the current position is displayed on the map, the controller 25 of the vehicle navigation system 1 controls the relation between the detail rate of the map and the accuracy of the measurement so that the display of the map can reduce an unsuitable feeling of the user.

When the precise measurement is not available in the accuracy priority mode, the measurement mode is fixed to the standard measurement mode and the displaying for the current position on the fourth scale is prohibited by means of the processes of steps 220, 225, 230 shown in FIG. 4. Accordingly, when the current position is displayed on the map, the controller 25 of the vehicle navigation system 1 controls the relation between the detail rate of the map and the accuracy of the measurement so that the display of the map can reduce the unsuitable feeling of the user.

When the map scale for displaying the current position is set to the fourth scale where the precise measurement is available in the map priority mode, the measurement mode is set to the precise measurement by means of the processes of steps 255, 245 shown in FIG. 4. When the map scale for displaying the current position is set to one of the first to third scales where the precise measurement is available in the map priority mode, the measurement mode is set to the standard measurement mode by means of the processes of steps 255, 260. In such a situation, the navigation system 1 can select one of the autonomous positioning GPS receiver 11 and the kinematics positioning GPS receiver 12 to determine the current position based on which scale of the map is used for displaying the current position. Accordingly, when the current position is displayed on the map, the controller 25 of the vehicle navigation system 1 controls the relation between the detail rate of the map and the accuracy of the measurement so that the display of the map can reduce the unsuitable feeling of the user.

When the precise measurement is unavailable in the map priority mode, the measurement mode is fixed to the standard measurement mode and the displaying for the current position on the map of the fourth scale is prohibited by means of the processes of steps 220, 225, 230 shown in FIG. 4.

In the whole operation of the vehicle navigation system 1, when the precise measurement by means of the kinematics positioning GPS receiver 12 is not available, the fourth scale of the map is prohibited to use for displaying the map. According to the operation, the detail rate (scale) of the map for displaying the current position is restricted based on which one of the receivers 11, 12 is used for measuring the current position. Therefore, when the current position is displayed on the map, the controller 25 of the vehicle navigation system 1 can control the relation between the detail rate of the map and the accuracy of the measurement as appropriate so that the display of the map can reduce the unsuitable feeling of the user.

In the embodiment, the navigation system 1 is used for mounting the vehicle. However, the navigation system 1 may be used for mounting on another apparatus, such as a ship. The navigation system 1 may be a portable type, which is carried by people.

The autonomous positioning GPS receiver 11 and the kinematics positioning GPS receiver 12 correspond to position determination units of the present invention. The autonomous positioning GPS receiver 11 corresponds to a first position determination unit of the present invention. A differential GPS (D-GPS) receiver, which uses a D-GPS scheme, may be used for the first position determination unit instead of the autonomous positioning GPS receiver 11. The autonomous positioning GPS receiver 11 and the D-GPS receiver may be switched by software to use as the first position determination unit.

The kinematics positioning GPS receiver 12 corresponds to a second position determination unit, which can determine the current position accurately than the first position determination unit. Another receiver may be used as the second positioning unit if the receiver is more accurate than the first position determination unit.

The maps according to the first through fourth scales of the map data correspond to a plurality of maps that have different detail rate. The map in accordance with one of the first though third scales of the map data corresponds to a first map. The map in accordance with the fourth scale of the map data corresponds to a second map, which is more detail than the first map.

The present invention should not be limited to the embodiment discussed above and shown in the figures, but may be implemented in various ways without departing from the spirit of the invention.

For example, in the embodiment, when the kinematics positioning GPS receiver 12 is not available, the map of the fourth scale is always prohibited to use for displaying the map regardless of the operation mode, which are the accuracy priority mode and the map priority mode. However, the map of the fourth scale may be prohibited to use for displaying the map when the precise measurement mode is not available only in a certain condition. For example, the navigation system 1 may have an operation mode so that the map having the fourth scale can be displayed on the display 21 regardless of the availability of the precise measurement when the operational switches 23 are operated by the user.

In the embodiment, the maps having different scales are used as an example of a plurality of maps that have different detail rate. However, other maps having different displaying densities in the same scale may be used as the plurality of maps that have different detail rates.

The vehicle navigation system 1 may use a dead reckoning to accurately determine the current position as well as the position measurement. The dead reckoning uses a gyroscopic sensor, a vehicle velocity sensor, and a map matching.

What is claimed is:

1. A navigation system comprising:
    position determination units that have a first position determination unit determining a position as a first position and a second position determination unit determining the position as a second position accurately than the first position determination unit;
    maps that have a first map and a second map that is more detail than the first map;
    a display that displays one of the first position determined by the first position determination unit and the second position determined by the second position determination unit on one of the first map and the second map; and
    a controller that controls a relation between the position determination units and the maps to display one of the first position and the second position on one of the maps in the display,
    wherein the controller selects one of the maps to display the position determined by one of the position determination units based on which position determination unit is used to determine the position, and
    wherein the controller prohibits using the first map to display the second position determined by the second position determination unit when the second position determination unit is used to determine the position.

2. The navigation system according to claim 1, wherein the controller selects the second map to display the second position determined by the second position determination unit when the second position determination unit is used to determine the position.

3. A navigation system comprising:
    position determination units that have a first position determination unit determining a position as a first position and a second position determination unit determining the position as a second position accurately than the first position determination unit;
    maps that have a first map and a second map that is more detail than the first map;
    a display that displays one of the first position determined by the first position determination unit and the second position determined by the second position determination unit on one of the first map and the second map; and
    a controller that controls a relation between the position determination units and the maps to display one of the first position and the second position on one of the maps in the display,
    wherein the controller selects one of the maps to display the position determined by one of the position determination units based on which position determination unit is used to determine the position, and
    wherein the controller prohibits using the second map to display the first position determined by the first position determination unit when the second position determination unit is unavailable and the first position determination unit is used to determine the position.

4. The navigation system according to claim 3, wherein the controller includes:
    accuracy determination means for determining whether the second position determination unit is available;
    map setting determination means for determining whether the display is set to display the position determined by one of the position determination units on the second map when the accuracy determination means determines that the second position determination unit is unavailable; and
    map setting means for setting the display to display the position on the first map when the map setting determination means determines that the display is set to display one of the positions on the second map.

5. The navigation system according to claim 3, wherein the controller selects the first map to display the first position determined by the first position determination unit when the second position determination unit is unavailable and the first position determination unit is used to determine the position.

6. A navigation system comprising:
position determination units that have a first position determination unit determining a position as a first position and a second position determination unit determining the position as a second position accurately than the first position determination unit;
maps that have a first map and a second map that is more detail than the first map;
a display that displays one of the first position determined by the first position determination unit and the second position determined by the second position determination unit on one of the first map and the second map; and
a controller that controls a relation between the position determination units and the maps to display one of the first position and the second position on one of the maps in the display, wherein the controller selects one of the position determination units to determine the position based on which map is used to display the position.

7. The navigation system according to claim 6, wherein the controller prohibits using the second position determined by the second position determination unit when the first map is used to display the position.

8. The navigation system according to claim 6, wherein the controller selects the first position determined by the first position determination unit to display on the first map when the first map is used to display the position.

9. The navigation system according to claim 6, wherein the controller prohibits using the first position determined by the first position determination unit when the second map is used to display the position.

10. The navigation system according to claim 6, wherein the controller selects the second position determined by the second position determination unit to display the position on the second map when the second map is used to display the position.

* * * * *